J. H. Whitney,
Grain Binder.

No. 109,985.

3 Sheets Sheet. 1.

Patented Dec. 6. 1870

Witnesses:
J. C. Brecht
Phil T. Dodge

Inventor:
John H. Whitney
by Dodge & Son
Attys.

*J. H. Whitney,*
*Grain Binder.*

No. 109,985.   Patented Dec. 6, 1870.

Witnesses:
T. C. Brecht
Phil T. Dodge

Inventor
John H. Whitney
by Dodge & Munn
Attys.

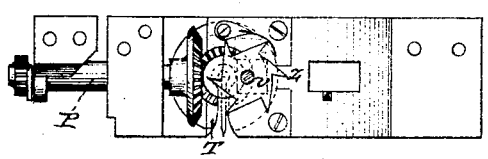
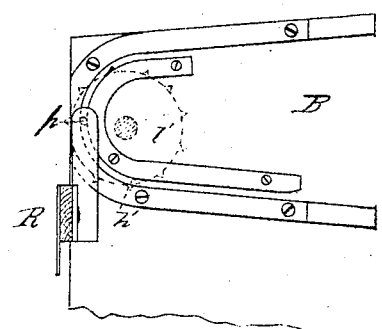
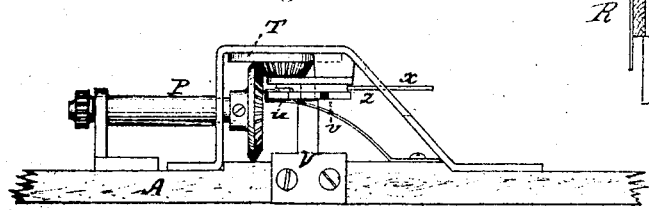
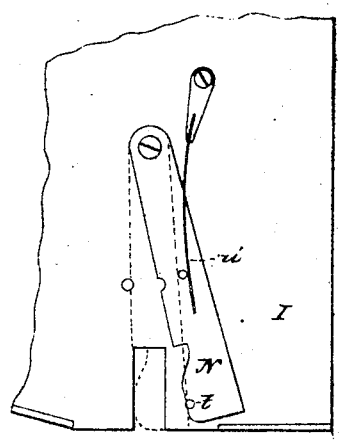
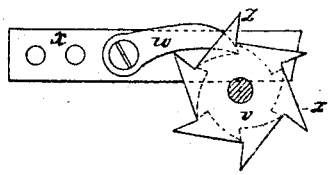
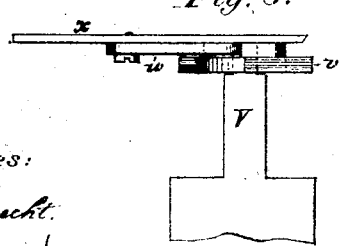

UNITED STATES PATENT OFFICE.

JOHN H. WHITNEY, OF ROCHESTER, MINNESOTA.

IMPROVEMENT IN COMBINED GRAIN HARVESTERS AND BINDERS.

Specification forming part of Letters Patent No. 109,985, dated December 6, 1870.

*To all whom it may concern:*

Be it known that I, JOHN H. WHITNEY, of Rochester, in the county of Olmsted and State of Minnesota, have invented certain Improvements in Combined Reapers and Binders, of which the following is a specification, reference being had to the accompanying drawings.

My invention relates to that class of machines denominated combined harvester and grain-binder; and the invention consists in an improved reel and rake, and in certain improved devices for compressing and binding the grain, all being arranged to operate in unison, or automatically, as hereinafter more fully explained.

Figure 1:
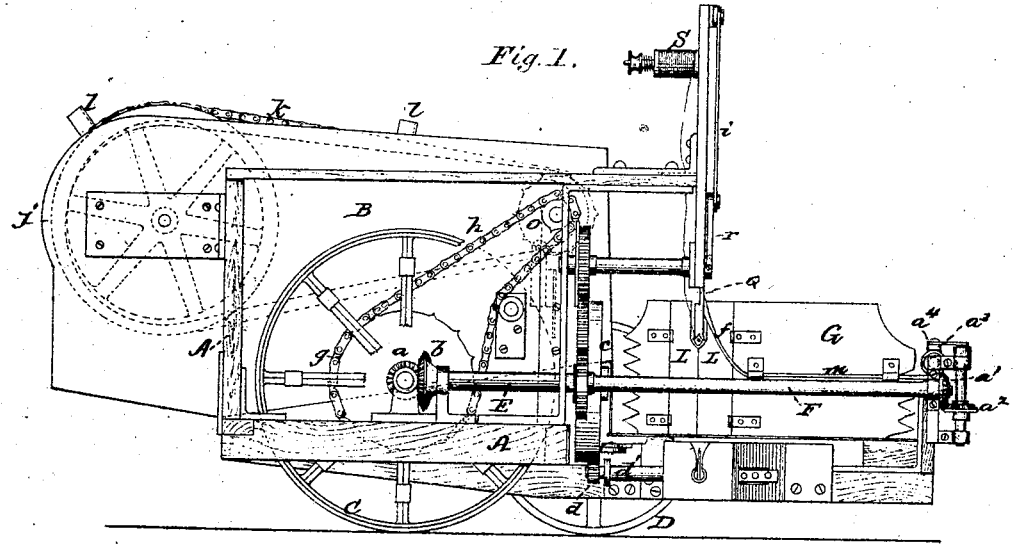
Figure 2:
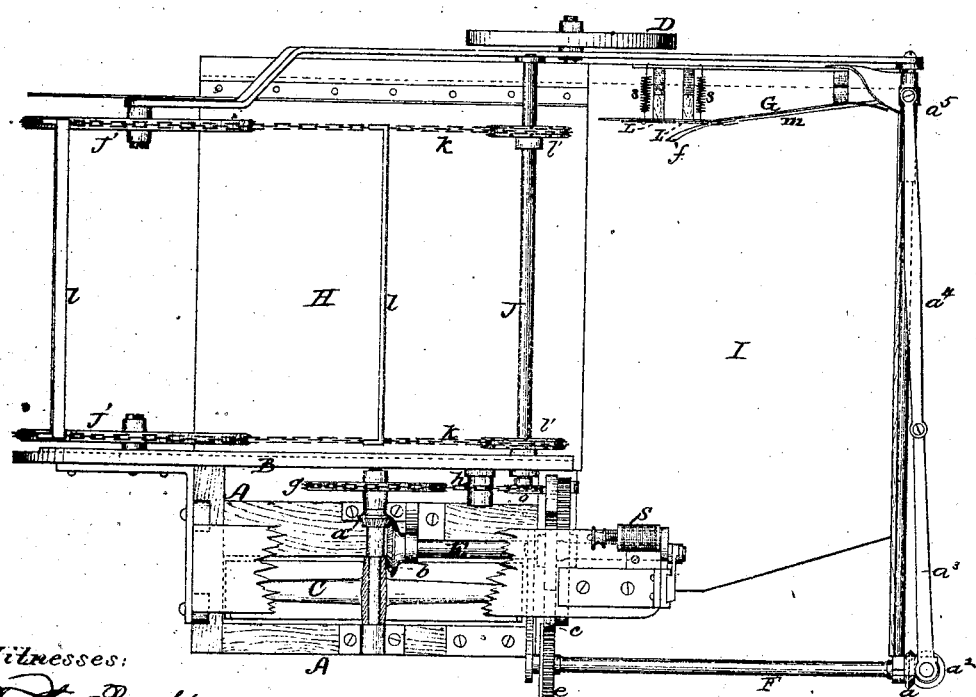
Figure 3:
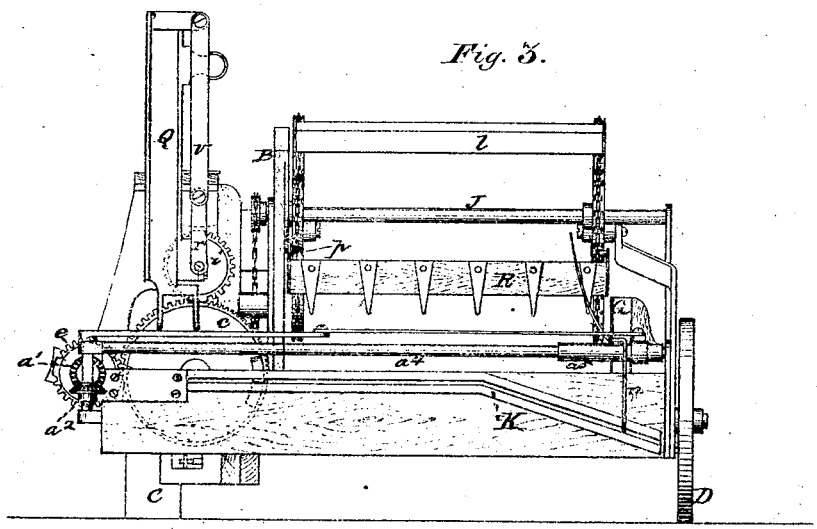
Figure 4:
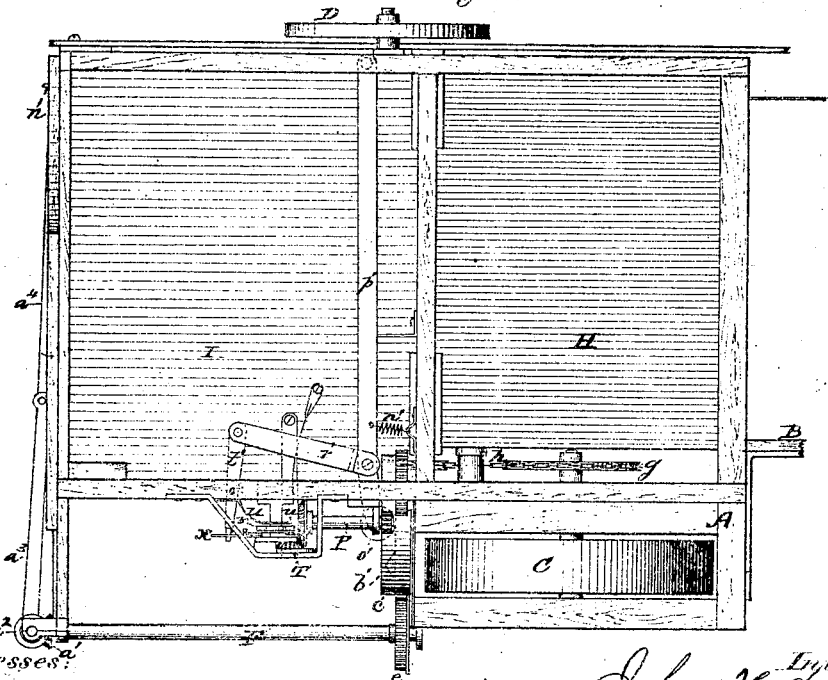

Figure 1 is a side elevation of the machine complete. Fig. 2 is a top-plan view of the same, with a portion broken away to show the mechanism. Fig. 3 is a rear elevation, and Fig. 4 is a bottom-plan view. Figs. 5, 6, 7, 8, 9, and 10 are portions shown more in detail, to illustrate their construction.

In constructing my improved machine, I make a rigid rectangular frame, A, upon the front end of which is located the cutting apparatus, not shown in the drawings, as it may be of any suitable style. This frame is made long enough to support two platforms, the front one, H, being a little inclined, its rear end being higher than its front, while the rear platform I is level, and depressed somewhat below the rear end of the front one, and being longest crosswise of the machine, as represented in Figs. 1 and 2, the inclination or line of the front platform being indicated by dotted lines in Fig. 1. The frame is also extended a little to the left, alongside of the front platform, as shown in Figs. 2 and 4, to afford bearings for the driving-wheel C and the operating mechanism; there being also a bearing-wheel, D, attached at the opposite side of the platform, this wheel D being located farther back than wheel C, as shown in Figs. 1 and 4.

Alongside of the front platform, on the side next to the driving-wheel, I locate a vertical partition, B, which serves to keep the grain from the mechanism, and also as a support and guide for the reel and rake, there being a side board also at the opposite side of the platform H, but less in height, this latter side board having its front end projecting forward of the cutter-bar, to serve as a divider to separate the grain to be cut from that to be left standing.

The reel consists of two endless chains, $k$, arranged near the outer sides of the front platform, and mounted on four sprocket-wheels, two at the front, marked $J'$, and two at the rear, marked $l'$, the latter being secured to a shaft, J, which extends across above the rear end of the platform H, and the former wheels $J'$ being mounted on studs or journals at the front, as shown more clearly in Fig. 2, there being connected to these chains, at suitable intervals, cross-bars $l$, to serve as beaters to draw the standing grain backward, like an ordinary reel. The rake E is formed by attaching to one of these cross-bars a series of teeth, of proper length to reach the platform, as shown in Fig. 3. The chains, of course, must be so arranged as to have their lower portion parallel with the face of the platform H, and thus cause the rake E to sweep along its face from front to rear, and thereby carry the grain back and deliver it to the platform I, upon which it is subsequently gathered into a bundle and bound.

In order to guide the rake and hold it in proper position, it has rigidly attached to the end next the partition B an arm, $p$, which projects inward past the chain to which the rake is secured; and on its outer face this arm, at its end, is provided with an outwardly-projecting wrist, which works in a groove, $h'$, formed on the inner face of the partition, as represented in Fig. 10. The groove proper need not extend around the entire distance traveled by the rake, but only around its rear portion, where it is so arranged as to hold the rake in a vertical position, or nearly so, and cause it to rise from the platform in that position until it has risen far enough to leave the grain, after which it may swing over in a circle. The balance of the way a single strip or bar may be secured to the partition B, to serve as a guide or rest for the wrist of the arm of the rake to work upon, and thus keep the rake in proper position, this bar or guide being so arranged along the lower side as to hold the rake vertical and keep it from tipping and slipping over the grain. This combined reel and rake is operated by a chain, $h$, which passes around a sprocket-wheel, O, secured to the end of the reel-shaft J, outside of the partition B, and is driven by another sprocket-wheel, $g$, secured to the inner end of the axle of the driving-wheel C, both wheels C and $g$ being tight on the axle.

The devices for gathering the grain into a bundle and binding it are all located on the rear part of the machine, and in their general construction are similar to those contained in the machine described in an application heretofore filed by me. There are, however, certain improvements in the construction and arrangement of the parts by which the operation of the machine is greatly improved, and which I will proceed to describe.

A gatherer, G, is mounted on the rear platform I, to gather the grain into a bundle and deliver it to the binder, as shown in Figs. 1 and 2. This gatherer consists of a plate or frame, G, set vertically across the rear platform, and attached rigidly to a tubular sleeve, $a^5$, which slides to and fro on a rod, $a^*$, arranged across the rear end of the hind platform, as represented in Figs. 2 and 3. This gatherer G has an opening cut in it, to permit it to pass by the wire-carrier as it is brought to the opposite side of the platform, where the binding is effected, the two parts of the carrier being supported by a frame-work in its rear, holding them in their proper relative position. As represented in Fig. 1, there is a small door or piece, L, hinged on each side of the opening in G, they being held shut by springs $s$ $s$, as represented in Fig. 2. As the opening is thus closed as the gatherer moves forward, the grain or straw is prevented from getting into it, and thus it is kept out of the way of the wire-carrier C as the latter descends to carry the wire down behind the bundle to the twister. The carrier C descends in rear of these doors L after the gatherer has moved across the platform, and they permit the gatherer G to move back again, while the carrier C remains down, the doors L yielding as the gatherer presses them against the carrier C in its backward movement.

Upon the face of the gatherer G I have arranged a compressor, which consists of a rod or shaft, $m$, which has one or more arms, $f$, turned upward, as shown in Figs. 1 and 2. This shaft $m$ has its rear end extending back over the rear end of the platform I, where it is provided with a crank-arm $n$, upon the lower end of which is a wrist that works in a groove, K, formed on the back side of the rear or end board of the platform I, as shown in Fig. 3. The first part of this groove K is made inclined, so that the compressor-arm $f$, which stands upright at the beginning of its movement, will be turned down to a horizontal position as the gatherer G moves forward, and carries the wrist of the compressor-arm $n$ up the incline, thus causing the compressor $f$ to press down upon the grain in front of G, and hold it in a firm, compact bundle as the gatherer carries it across to the binder. The gatherer G is moved at suitable intervals by a pitman, $a^4$, which is connected at one end to the sleeve $a^5$, and at its other end to an arm, $a^3$, which is secured to the upper end of a vertical shaft located at the front or inner rear corner of the platform I, as shown in Figs. 1 and 2, this shaft being operated through the medium of bevel-gear $a^1$ and $a^2$ connected by a shaft, F, having a stop-pinion, $e$, on its opposite end, and which engages with the main driving-gear wheel $c$, this latter being, in turn, secured upon a shaft, E, which at its opposite end is connected by bevel-pinions $b$ and $a$ to the axle of the driving-wheel C, from which all the parts are operated, the arrangement of these driving-wheels being shown in Figs. 1 and 2, as well as that of the stop-wheel $i$, which operates the wire-carrier R. These stop-wheels $c$, $c$, and $i$, which impart motion to the gatherer G and the wire-carrier R, as also that which operates the twister, are of peculiar construction, in order to impart to these devices an intermittent motion at the required intervals; but as this stop-gear forms the subject of a separate application it will not be herein further described.

The twister T, which, with the wire-carrier R, performs the binding, is located under the left-hand edge of the rear platform I, and the wire-carrier R is located directly over it, as shown in Figs. 1 and 3, these parts, and their mode of operation, having been fully described in my previous application. In this machine, however, I intend to use but a single wire for binding, and it has, therefore, become necessary to modify somewhat the construction.

In order to prevent straw or other substances from working down, or being thrust into the twister by the wire-carrier, I secure to the under side of the platform I a plate, M, Fig. 9, which is pivoted to swing sidewise, it having a spring, $u'$, arranged to press it over so as to hold it in place over the twister, and thus keep the opening closed through which the wire-carrier descends, except when the latter, by its descent, shoves it over to one side, the spring throwing it back again as soon as the carrier is withdrawn.

To the under side of this hinged plate N is secured a pin, $t$, Fig. 9, which projects downward a short distance in front of the twister, and serves as a guide for the wire, keeping it pressed over to one side so as to insure its entering the slot in the twister on the proper side of the central point or finger therein, while the other end of the wire enters the other slot on the opposite side of the finger; it being essential, in order to produce the requisite twist, that one end of the band or wire should be in one slot and the other end in the other slot, the finger being between the two, the twister itself being constructed as described in the previous application, hereinbefore referred to, and being operated by a bevel-pinion on the end of a shaft, P, as shown in Figs. 5 and 6, motion being imparted to this shaft by a stop-pinion, which engages with the driving-wheel c. Instead of the pin t, a staple or eye may be used, and may be found preferable, as it will hold the wire more securely in place.

In order to hold the end of the wire after it is cut, and while the next sheaf is being prepared and bound, I make use of a device represented in Figs. 7 and 8. This consists of a ratchet-wheel, v, having teeth z, arranged as shown in Fig. 7, this wheel being journaled on the end of an arm, V, directly in rear of the twister T, and a little to one side, as shown in Figs. 5 and 6. A plate, u, secured to the frame, extends out alongside of this ratchet-wheel, and is bent around it and back on the opposite side, a short distance, as shown in Fig. 6, thereby forming a support for the wire on both sides of the teeth z of the wheel v, so that when the end of the wire is inserted in one of the slots of the twister, and extends across the bent portion of the plate u, the teeth of the wheel v, as they are brought around successively upon it, will clasp the wire and hold it tight between the straight edge of the tooth z and the top of the plate u. Motion is imparted to this clasping-wheel v by means of a pawl, w, which is pivoted to the side of the knife x, which severs the wire when twisted, the pawl w engaging in a reverse set of ratchet-teeth formed on the body or hub of the wheel v, as shown by dotted lines in Figs. 7 and 8. The manner of operating this knife x and ratchet w is shown in Fig. 4, these parts all being arranged under the rear platform I, as there represented. A lever, p', is pivoted at one end to the opposite side of the platform, its other end being provided with a roller, o', against which, at suitable intervals, a cam-projection, b', on the side of gear-wheel c, strikes, thus forcing the free end of the lever p' over to one side, a spring, n', serving to draw it back as soon as the cam has passed. To this lever p' is pivoted a rod, r', the opposite end of which is connected to a lever, t, pivoted at or near its center, and having its opposite end connected to the knife x. It will be seen that, by this arrangement of devices, the knife x and pawl w are operated every time the projection b' on wheel c strikes the roller on the free end of lever p', which in this case occurs once at each revolution of the wheel c.

It will, of course, be understood that the wheels will be so proportioned as to impart to all these various devices the requisite movements at the proper intervals, in order to bring them all into successive operation, all the parts, except the reel and rake and the wheel c, having intermittent movements.

From this description the operation of the machine will be readily perceived. As the machine is propelled, the grain is cut at its front and falls upon the platform H, the cross-bars l of the reel serving to draw the grain to the sickle and causing it to fall over on the platform as it is cut. As the rake R comes around it sweeps the grain back along the inclined platform H and delivers it upon the platform I in front of the gatherer G, which then commences to move, thereby gathering the grain up into a bundle, the compressor f turning down upon top of the grain, and thereby compressing and holding it in a more compact form. As the gatherer shoves the bundle or mass of grain over to the end of platform I, it is brought against the wire, the lower end of which is held by the clamping-wheel v, the upper portion passing up through the eye of the carrier Q, which at this time is elevated. When the gatherer has reached the limit of its forward movement the carrier Q descends, carrying the wire down on the rear side of the bundle, drawing it tight around the bundle, and delivering it to the slot in the twister, when the latter immediately commences to rotate, thereby twisting the wire securely together and completing the binding of the bundle. As soon as this is done the cam on the wheel operates the knife x, severing the wire, releasing the bundle, which then falls upon the ground, the wheel v at the same time having secured the end of the wire again preparatory to binding the next bundle, the carrier Q rising again as soon as this is completed, the gatherer having returned to the other end of the platform as soon as the carrier had placed the wire in the twister, and by its return having turned the compressor f up out of the way of the grain, to be brought back by the rake at its next round.

By these means I am enabled to produce a very compact and perfect machine that will both cut and bind the grain at one continuous operation. By placing another spool under the platform I and arranging it to have its wire delivered to the twister, I can bind with two wires also; but the machine is more especially designed to use a single wire.

Having thus fully described my invention, what I claim is—

1. The rake R, provided with the arm p, arranged to work in the guide h' extending around the rear end of the track of the rake, said guide being located, in relation to the wheels l', substantially as described, whereby the rake is feathered and caused to rise vertically, or nearly so, until it is lifted clear of the grain, substantially as set forth.

2. In combination with the gatherer G, the hinged plates L, arranged to operate substantially as described.

3. The combination of the compressor f with the gatherer G, constructed and operating substantially as described.

4. In combination with the platform I, having an opening for the wire-carrier Q, the hinged or yielding plate N, with its operating-spring $u'$, arranged to operate as set forth.

5. In combination with the yielding plate N, the pin $t$, or its equivalent, for guiding the wire to the twister, as described.

6. The wheel $v$, in combination with the plate $u$, arranged, in relation to the twister, substantially as described, for holding the wire, as set forth.

7. The combination of the pivoted levers $p'$ and $t$, connected by the rod $r'$, with the knife $x$, and pawl $w$, arranged to be operated by the cam on wheel $c$, substantially as described.

JOHN H. WHITNEY.

Witnesses:
  PHIL. T. DODGE,
  W. C. DODGE.